(12) United States Patent
Kimber

(10) Patent No.: US 9,734,140 B2
(45) Date of Patent: *Aug. 15, 2017

(54) METHOD, APPARATUS AND COMPUTER PROGRAM FOR MODEL-DRIVEN MESSAGE PARSING

(75) Inventor: Timothy Kimber, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,363

(22) Filed: Jun. 18, 2012

(65) Prior Publication Data

US 2012/0254262 A1    Oct. 4, 2012

Related U.S. Application Data

(63) Continuation of application No. 12/190,344, filed on Aug. 12, 2008, now Pat. No. 8,229,891.

(30) Foreign Application Priority Data

Aug. 16, 2007   (EP) ................................... 07114419

(51) Int. Cl.
| | |
|---|---|
| *G06F 7/00* | (2006.01) |
| *G06F 17/00* | (2006.01) |
| *G06F 17/27* | (2006.01) |
| *G06F 17/22* | (2006.01) |

(52) U.S. Cl.
CPC ...... *G06F 17/2705* (2013.01); *G06F 17/2211* (2013.01)

(58) Field of Classification Search
CPC ............ G06F 17/2211; G06F 17/2705; G06K 9/00154; H04J 3/0605
USPC ....................................................... 707/640
See application file for complete search history.

(56) References Cited

U.S. PATENT DOCUMENTS

| | | | | |
|---|---|---|---|---|
| 5,502,817 A | * | 3/1996 | Krone ................ | G06F 13/4022 370/403 |
| 5,574,906 A | * | 11/1996 | Morris ................ | G06F 11/1451 707/640 |
| 5,870,444 A | * | 2/1999 | Mynett ................ | H04J 3/0605 370/513 |
| 6,169,820 B1 | * | 1/2001 | Wade .................. | G10L 19/0018 382/239 |
| 7,007,223 B2 | * | 2/2006 | Boyanapalli ....... | G11B 20/1833 714/759 |
| 7,239,727 B2 | * | 7/2007 | Taylor ................. | G06K 19/06 382/119 |
| 7,389,408 B1 | * | 6/2008 | Nelson ................ | G06F 9/30149 712/300 |

(Continued)

*Primary Examiner* — Binh V Ho

(74) *Attorney, Agent, or Firm* — Steven M. Greenberg, Esq.; CRGO Law

(57) ABSTRACT

There is disclosed a method, apparatus and computer program for parsing a message using a message model. A message is received comprising one or more message fields. This message is stored as a reference bitstream. The message model is used to compare a message field in one or more subsequently received messages with the equivalent field in the reference bitstream. Finally, responsive to determining that a message field in said one or more subsequently received messages matches a field in the reference bitstream a predetermined number of times, storing parser outputs for the matching field for future reuse.

10 Claims, 17 Drawing Sheets

(56) References Cited

U.S. PATENT DOCUMENTS

| | | | |
|---|---|---|---|
| 2002/0083210 A1* | 6/2002 | Harrison | G06F 17/3061 |
| | | | 719/310 |
| 2002/0141449 A1* | 10/2002 | Johnson | G06F 9/546 |
| | | | 370/473 |
| 2003/0110296 A1* | 6/2003 | Kirsch | H04L 29/06 |
| | | | 709/246 |
| 2005/0086246 A1* | 4/2005 | Wood | G06F 17/30289 |
| 2005/0111381 A1* | 5/2005 | Mukherjee | H04L 29/06027 |
| | | | 370/254 |
| 2006/0064424 A1* | 3/2006 | Heuer | G06F 17/2247 |
| 2007/0016897 A1* | 1/2007 | Todd | G06F 9/5055 |
| | | | 717/143 |
| 2007/0156750 A1* | 7/2007 | Calahan | G06F 17/272 |
| 2007/0192548 A1* | 8/2007 | Williams | G06F 17/30153 |
| | | | 711/154 |
| 2008/0147825 A1* | 6/2008 | Tanimoto | H04L 67/104 |
| | | | 709/218 |
| 2009/0058693 A1* | 3/2009 | Laker | H03M 7/40 |
| | | | 341/65 |

* cited by examiner

Parsing Overview

METHOD, APPARATUS AND COMPUTER PROGRAM FOR MODEL-DRIVEN MESSAGE PARSING

This application is a Continuation of U.S. application Ser. No. 12/190,344, filed Aug. 12, 2008, which claims priority to European Patent Application No. 07114419.0, filed Aug. 16, 2007, entitled "METHOD, APPARATUS AND COMPUTER PROGRAM FOR MODEL-DRIVEN MESSAGE PARSING," the entirety of which is incorporated herein by reference.

FIELD OF THE INVENTION

The invention relates to the field of model driven message parsing.

BACKGROUND OF THE INVENTION

Efficient parsing of non-XML messages is a requirement in many enterprises. Typically, non-XML messages from a legacy application are received on a queue, parsed into a structure that the receiving system can understand, processed and forwarded to the next application. Parsing is performed by walking a data structure which describes the message format (hereafter called the 'message model') and extracting from the bitstream markup and/or data for each model element. Repeated parsing of successive messages can be extremely processor-intensive.

There is a need therefore for a solution which improves parsing performance and thereby message throughput.

Such a technique has already been provided for self-defining XML messages. This is described at: www2005.org/cdrom/docs/p692.pdf Co-pending U.S. patent application Ser. No. 11/426,655 provides another solution. This describes the generation of a parsing template. The parsing template comprises a set of structural elements for a particular type of input message—for example, substrings representing parts of an XML message that are expected to be repeated within other requests from the same requester type for the same service. The template also includes inserts to indicate places in the messages where variation can be expected between one message and the next. This patent application however retrieves a complete parsing template based on a received service request and expects only small variations.

A more flexible mechanism is required in a situation where a received message is non-self-defining. Such messages (e.g. non-XML data) can be presented in a huge variety of formats and styles, making the XML techniques referenced above unfeasible. It is not feasible to use parsing templates in this environment.

SUMMARY OF THE INVENTION

According to a first aspect, there is provided a method for parsing a message using a message model comprising:
receiving a message comprising one or more message fields; storing the message as a reference bitstream;
using the message model to compare a message field in one or more subsequently received messages with the equivalent field in the reference bitstream;
and responsive to determining that a message field in said one or more subsequently received messages matches a field in the reference bitstream a predetermined number of times, storing parser outputs for the matching field for future reuse.

According to one embodiment the use of the message model to compare a message field in said one or more subsequently received messages comprises storing an index into each message field in the reference bitstream against an equivalent element in the message model.

In another embodiment, a portion of the reference bitstream is stored against each associated element in the message model.

In one embodiment it is determined that a message field in the one or more subsequently received message matches a field in the reference bitstream a predetermined number of times.

In one embodiment, this is done by determining a number of hits to misses ratio, wherein a hit is scored for a match between a message field in a subsequently received message and the equivalent field in the reference bitstream.

In one embodiment, if it is determined that parser outputs are stored for a particular message field in a subsequently received message, then the parser outputs can be used instead of parsing the message field.

According to another aspect, there is provided an apparatus for parsing a message using a message model comprising:
means for receiving a message comprising one or more message fields; means for storing the message as a reference bitstream;
means for using the message model to compare a message field in one or more subsequently received messages with the equivalent field in the reference bitstream; and means, responsive to determining that a message field in said one or more subsequently received messages matches a field in the reference bitstream a predetermined number of times, for storing parser outputs for the matching field for future reuse.

According to another aspect, there is provided a computer program comprising program code means adapted to perform the following method when the program is run on a computer:
receiving a message comprising one or more message fields; storing the message as a reference bitstream;
using the message model to compare a message field in one or more subsequently received messages with the equivalent field in the reference bitstream;
and responsive to determining that a message field in said one or more subsequently received messages matches a field in the reference bitstream a predetermined number of times, storing parser outputs for the matching field for future reuse.

BRIEF DESCRIPTION OF THE DRAWINGS

A preferred embodiment of the present invention is described, by way of example only, and with reference to the following drawings:

FIG. 1b illustrates an exemplary message having a structure defined by the model of FIG. 1a;

DETAILED DESCRIPTION

The preferred embodiment of the present invention requires a message parser to use a message model to parse a non-XML input message, as it is not usually possible to parse non-XML message styles without a model.

Figure 1A:
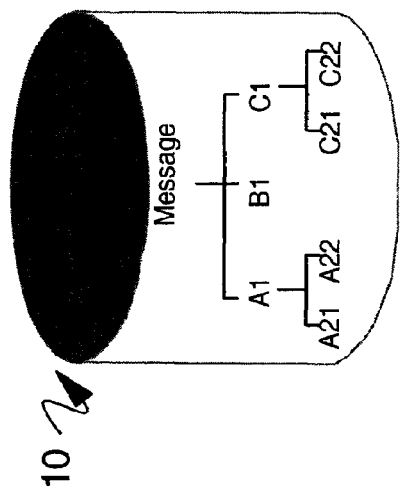
FIG. 1a illustrates an exemplary message model.
Figure 1B:
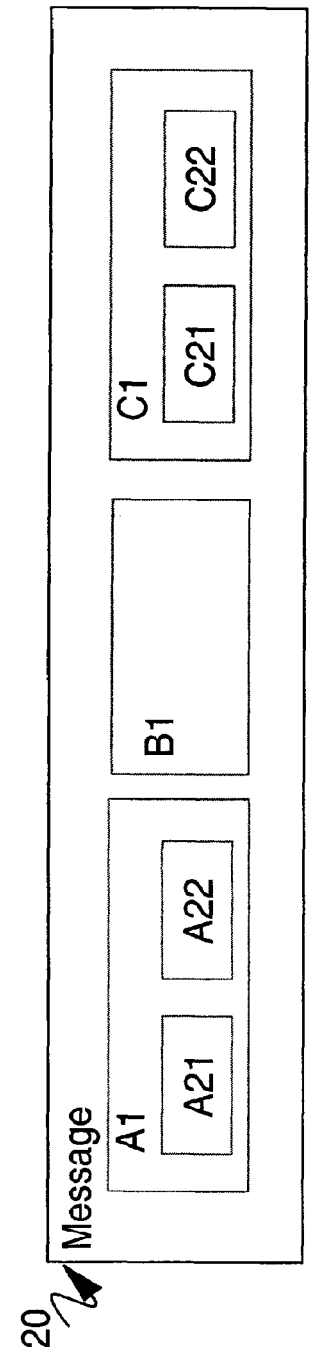

A message model typically describes the structure of expected input messages. An exemplary model is described with reference to FIG. 1a. Model 10 can be thought of as a tree comprising a root element Message with three child elements A1, B1 and C1. Child A1 in turn has two children A21 and A22. B1 does not have any children, whilst C1 also has two children C21 and C22. Such a model can be used by a message parser to interpret the fields of an incoming message. FIG. 1b provides an example of a message 20 having the structure described by model 10 of FIG. 1a. The exemplary message is shown having field values identical to its field names. Thus field A21 also contains a value of "A21". This is by way of example only.

Figure 4:
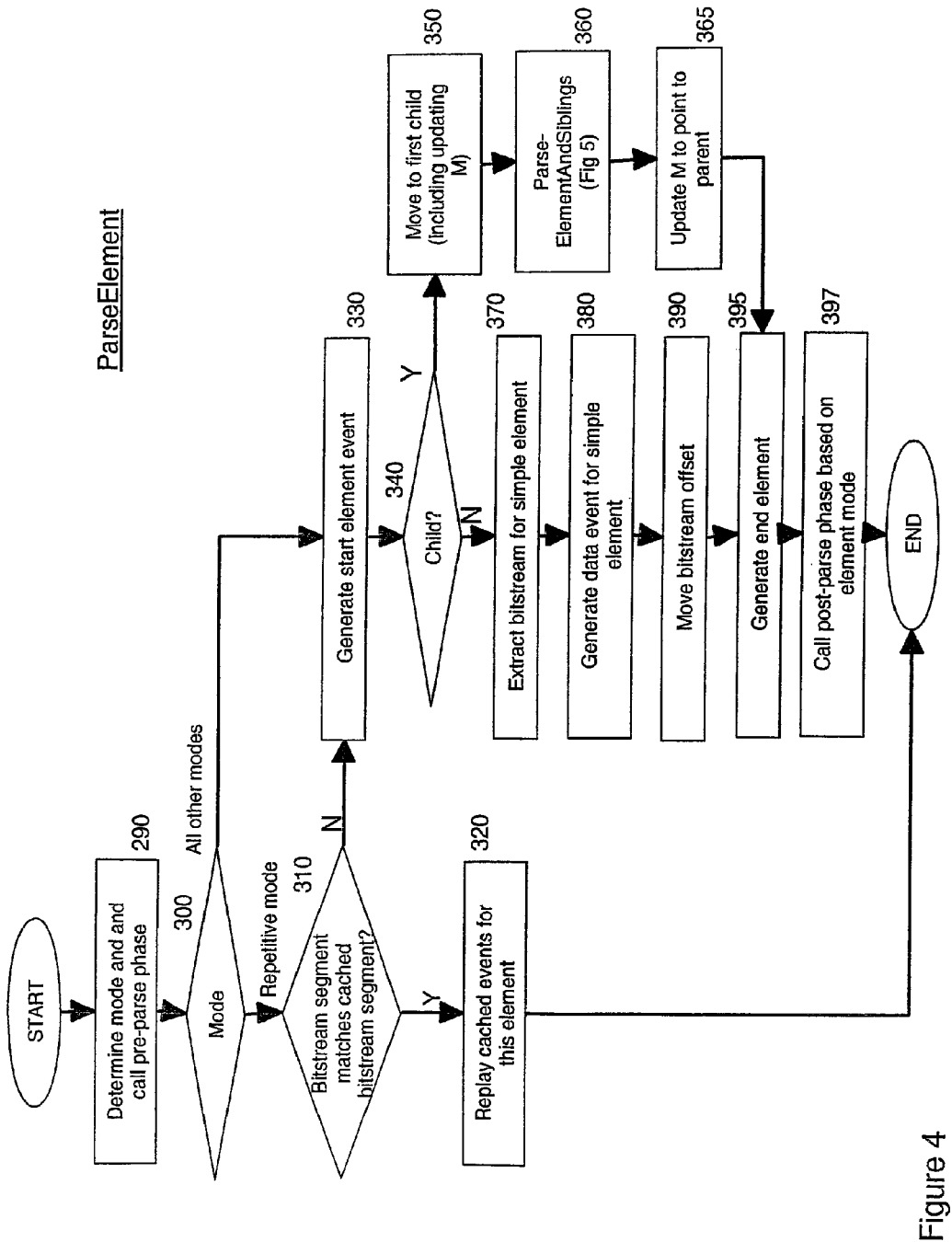
FIG. 4 shows the processing of the ParseElement method call, in accordance with a preferred embodiment of the present invention.
Figure 5:
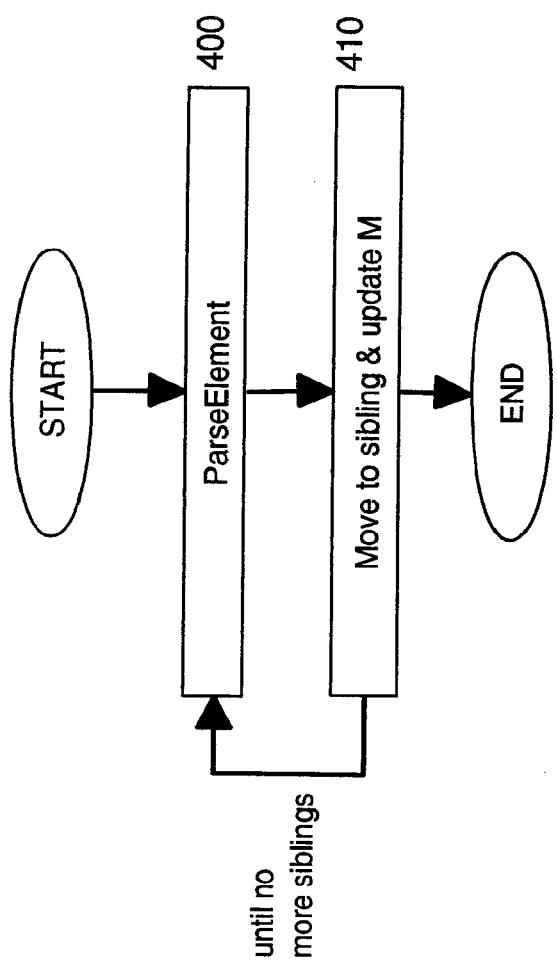
FIG. 5 shows the processing of the ParseElementAndSiblings method call, in accordance with a preferred embodiment of the present invention.

One example of a system which receives messages which that system interprets and processes appropriately is a message broker. When a new message is received at a system such as a message broker, that message is parsed by a model-driven parser in order to manipulate that message into a structure (for example, an event stream or a tree) which can subsequently be processed by the broker. Such parsing is illustrated with respect to the recursive process shown in FIGS. 4 and 5. FIG. 4 depicts a method "ParseElement" whilst FIG. 5 illustrates a "ParseElementAndSiblings" method. The parsing of a message 20 having the structure of model 10 will now be described with reference to these two figures. The parse processing of these figures should also be read in conjunction with appendix A.

Referring now to FIG. 4 (and Appendix A), a generic overview of the parsing process will first be explained. Message parsing is a thoroughly explored topic and so a fairly high-level explanation will be given. The overview given is however necessary in order to describe how the parsing process is to be modified with respect to the present invention. As FIG. 4 is first being described without reference to the specifics of a preferred embodiment of the present invention, steps 290, 300, 310, 320, 390 and 397 will be discussed later.

Although not specifically discussed in this generic overview, a pointer M is used to point to the current element in the model that is being processed and this is continually updated. Similarly, a pointer is used (and continually updated) to access the appropriate field in the message being parsed.

Message 20 (FIG. 1b) is received at step 330 and a start element event is generated for the root model element Message.

A test is performed at step 340 to determine whether (according to the model) Message has any children. In conformance with model 10, Message has three children A1, B1 and C1. Thus as shown in appendix A and also at step 350, the parser moves to the first child A1.

A ParseElementAndSiblings method call to the method illustrated in FIG. 5 is then made (step 360). This method then recursively calls the ParseElement method (step 400). which causes a start element event to be generated on A1 (step 330).

A determination is made at step 340 whether model element A1 has any children and, as A1 does, the parser moves to the first child A21 at step 350. Again a call is made to the ParseElementAndSiblings method (step 360) which in turn makes a call on the ParseElement method of FIG. 4 at step 400.

At step 330, a start element event is generated for child model element A21. It then determined at step 340, that element A21 does not have any children. Consequently the bitstream value is extracted from message 20's A21 field for this simple model element (step 370) and a data event is generated (step 380). Step 390 will be described later, as this is concerned with the specifics of the preferred embodiment.

Having generated a data event for A21, an end element event is generated for that same element. Step 397 will also be described later.

The ParseElement method was first recursively called from the ParseElementAndSiblings method (FIG. 5). Consequently, when A21 has been parsed, processing returns to FIG. 5, step 410 and the parser moves to A21's sibling A22. A start element is generated for A22 (step 330) A22 does not have any children (step 340) so path 370 to 397 is followed. This involves extracting the bitstream for the simple element from message 20's A22 field at step 370 and generating a data event for this simple element at step 380. An end element event is generated for A22 at step 395.

Model element A22 does not have any further siblings and consequently processing returns to from whence it was called, step 360. Processing subsequently proceeds to step 395 and an end element event is generated for A1 at step 395.

A1 has a sibling of B1 and so the parser moves to model element B1. The ParseElement method is called (step 400) on element B1. At step 330, a start element event is generated for B1. It is then determined at step 340 that B1 does not have any children. Consequently the bitstream value for this simple model element is extracted from message 20's B1 field (step 370) and a data event is generated for the simple element at step 380. An end element event is then generated for B1 at step 395.

Again, the ParseElement call was recursively called from the ParseElementAndSiblings method (FIG. 5). Consequently processing returns to step 410 and the parser moves to B1's sibling C1.

The ParseElement method is then called on C1 and a start element event is generated for model element C1 at step 330. It is determined at step 340 that element C1 does have a child C21 and the parser advances to that child at step 350. The ParseElementAndSiblings method is called on C21 at step 360 and this recursively calls at step 400 the ParseElement method on C21.

At step 330 therefore, a start element event is generated for model element C21 and it is determined at step 340 that C21 does not have a child. Consequently, the bitstream for this simple element is extracted from message 20's C21 field (step 370) and a data event is generated for this simple element at step 380. Finally an end element event for element C21 is generated at step 395.

Processing returns to FIG. 5 and the ParseElementAndSiblings method and sibling C22 is advanced to at step 410.

The ParseElement method is then called on sibling C22 at step 400 and this causes a start element event to be generated for C22 at step 330. It is determined at step 340 that element C22 does not have any children and so the bitstream value for this simple model element is extracted from message 20's C22 field (step 370). A data event for the simple element is then generated (step 380) and an end element event is generated at step 395.

Processing then returns to the ParseElementAndSiblings method of FIG. 5 and since C1 has no more children, this method has finished its work as far as C1's children are concerned. Element C1 made the call at step 360 (FIG. 4) and so processing now returns here and moves to step 395, where an end element is generated for element C1 at step 395.

A call was first made for the Message model element to ParseElementAndSiblings from step 360 of FIG. 4 and since Message does not have any more siblings (step 410), processing returns to step 395 and end element event is generated for Message. Processing then ends.

Thus typical processing of a new message has been described with reference to FIGS. 4 and 5 and also appendix A.

For some message producing applications, the differences between successive messages are confined to a small number of fields, with the remainder of the fields having the same value for each message. A lot of CPU cycles are wasted in such circumstances repeatedly parsing the same fields for every message. The mechanism described herein proposes a scheme by which this situation can be detected and exploited by the parser to save CPU cycles and thus improve parsing performance/message throughput.

Figure 17:
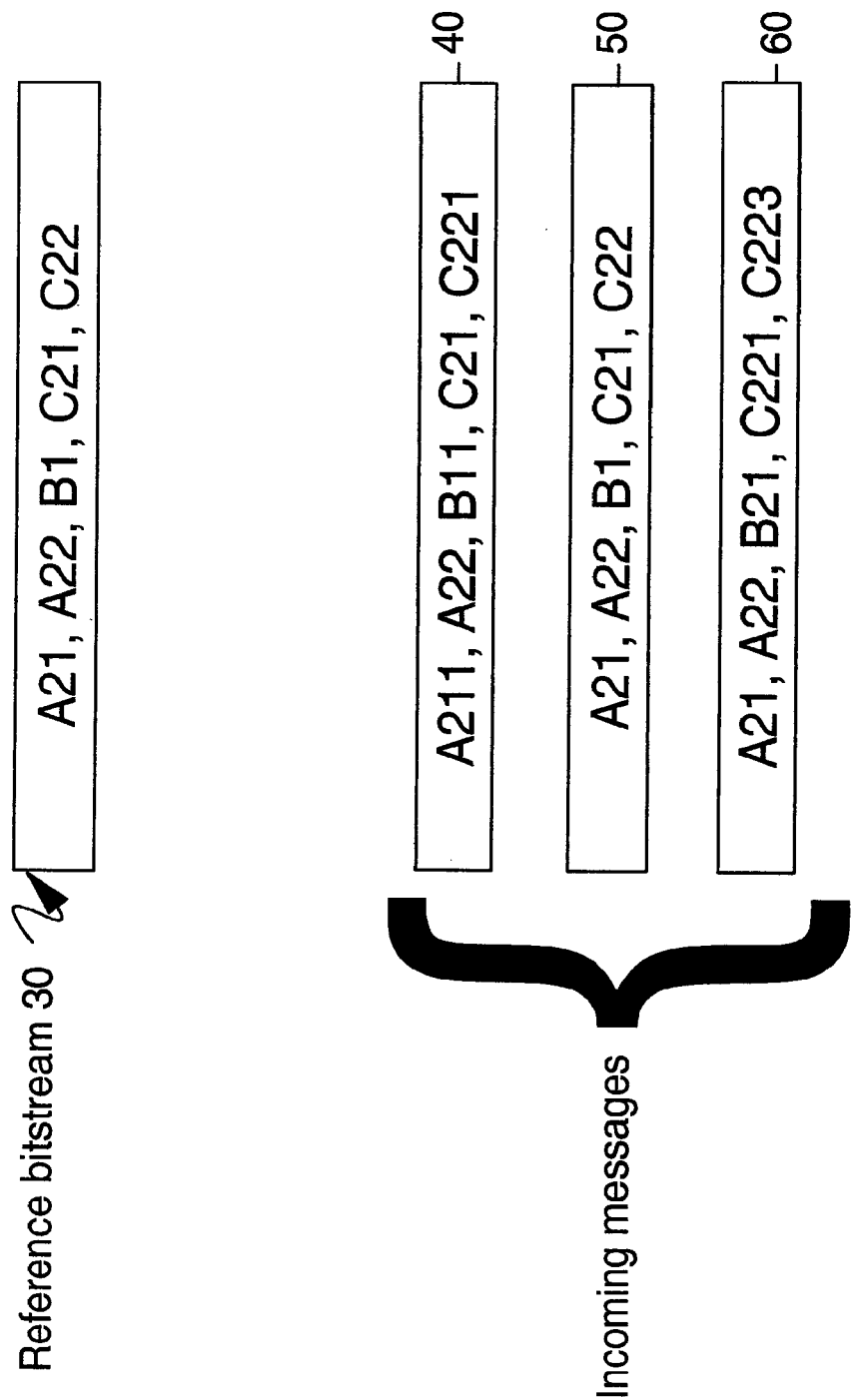
FIG. 17 illustrates an exemplary reference bitstream, along with some exemplary incoming messages.

Some exemplary messages are given in FIG. 17 and these will be used to describe the solution disclosed herein. The messages shown are structured according to model 10 but the figure shows the values only which are held by each message field.

Figure 2:
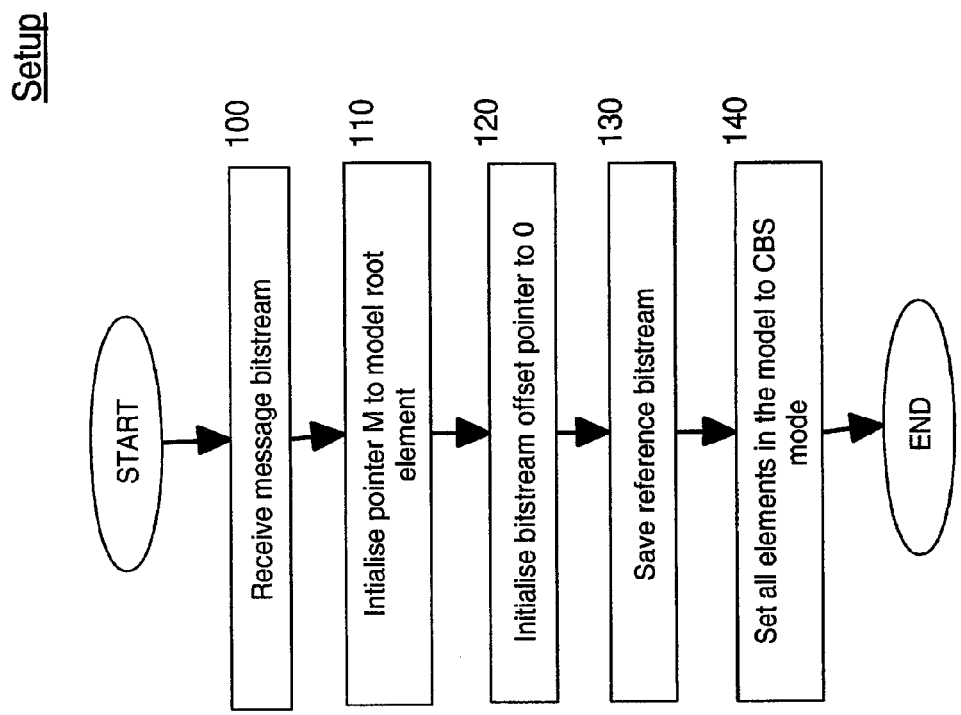
FIG. 2 depicts a setup process in accordance with a preferred embodiment of the present invention.

First the setup process of a preferred embodiment of the present invention will be described with respect to FIG. 2. A first message bitstream is received at step 100. FIG. 17 illustrates that the first message bitstream is message 30 "A21, A22, B1, C21, C2".

A pointer M is initialised to point to the model's root element (step 110). A bitstream offset pointer is set to offset 0 (step 120). This is because each character in a received offset is stored at an offset value.

The received message is then saved as a reference bitstream against which to compare subsequent messages (step 130). All elements in the model are set to CachingBitStream (CBS) mode (step 140). The possible modes in which a model element can exist will be explained later.

Once this has been done this message (and subsequent messages) can be recursively parsed in accordance with model 10.

Figure 3:
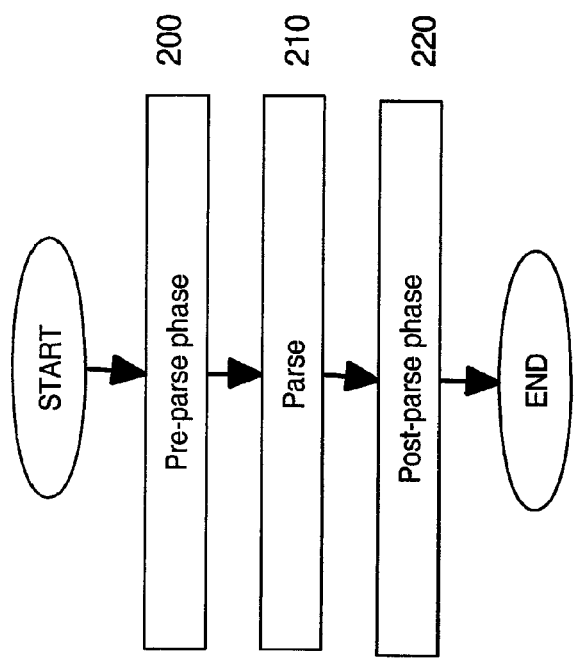
FIG. 3 provides an overview of the parsing process in accordance with a preferred embodiment of the present invention.
Figure 6:
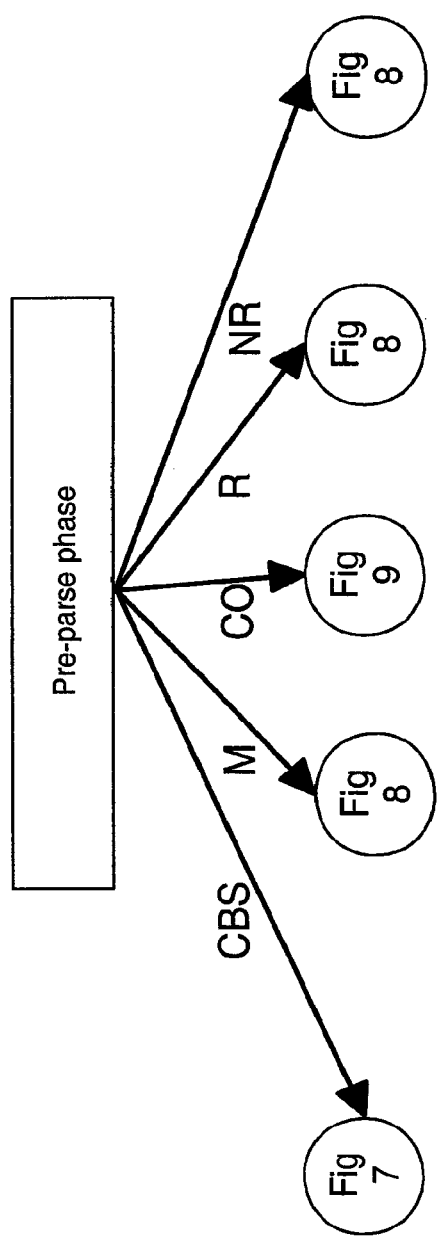
FIG. 6 illustrates an overview of the pre-parse process, in accordance with a preferred embodiment of the present invention.

FIG. 3 illustrates an overview of the parsing process. At step 200, a pre-parse phase is carried out for each element. FIG. 6 provides an overview of this phase. At step 210 the actual parsing of an element is carried out as per FIGS. 4 and 5. Finally, at step 220, a post-parse phase is executed for the element. An overview of the post-parse phase is provided by FIG. 10.

Figure 10:
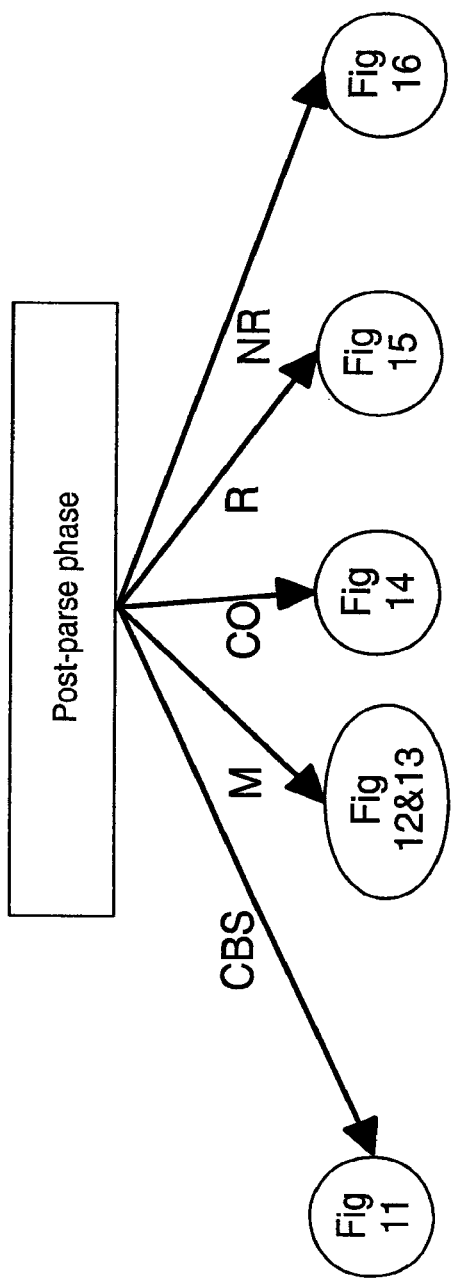
FIG. 10 illustrates an overview of the post-parse process, in accordance with a preferred embodiment of the present invention.

As shown in FIGS. 6 and 10, the detailed pre-parse and post-parse processing that is carried out for an element in the model, depends upon mode currently associated with that element.

Figure 7:
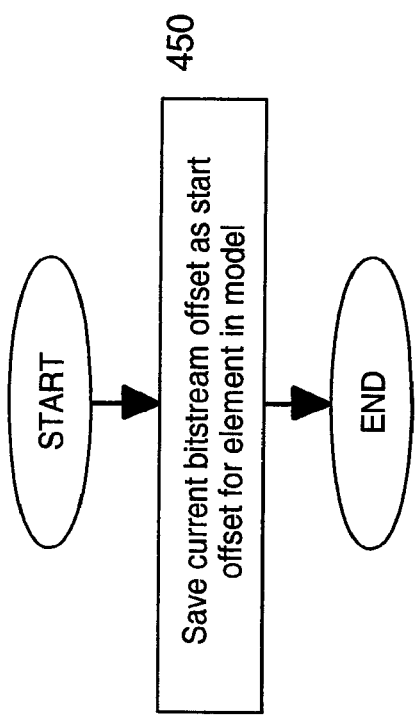
FIG. 7 depicts the pre-parse processing of a preferred embodiment of the present invention when in CachingBitStream mode.
Figure 18:
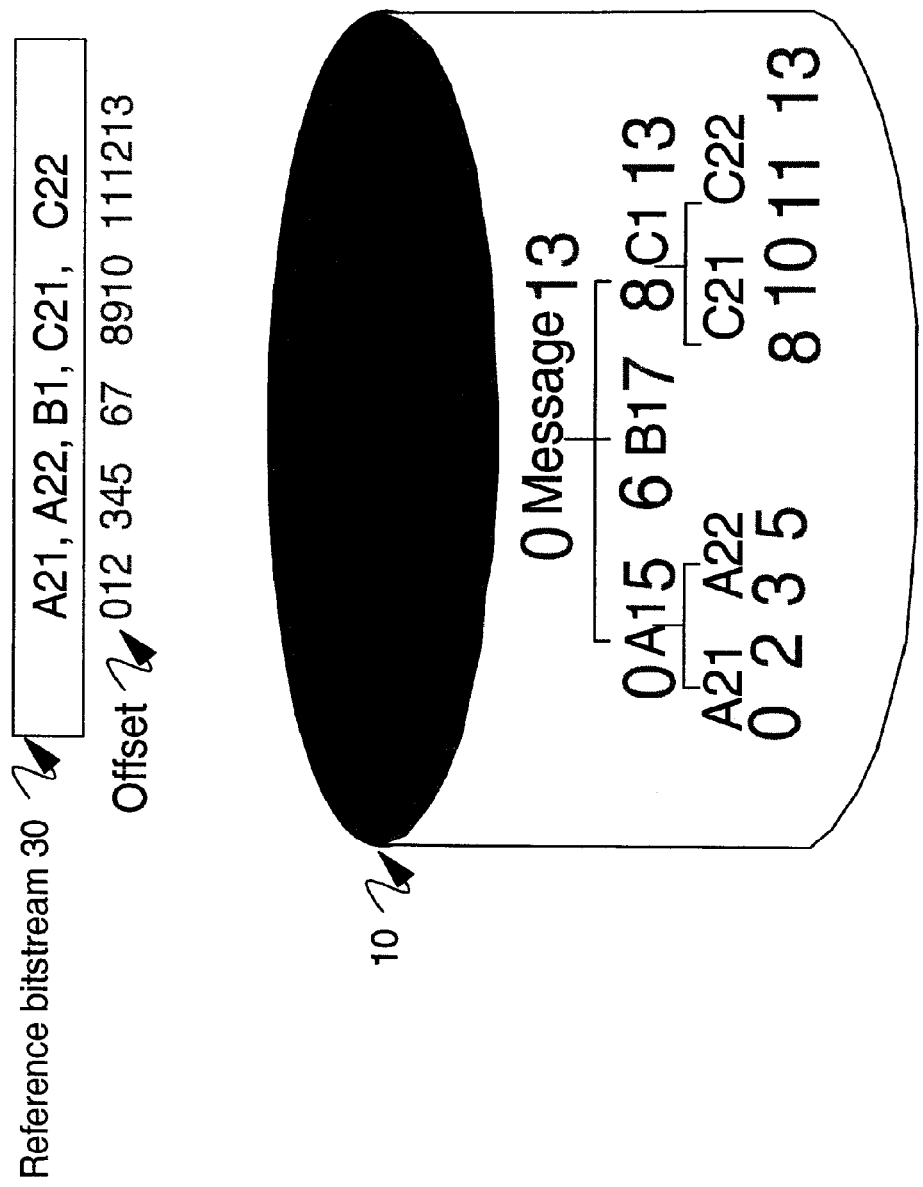
FIG. 18 shows, in accordance with a preferred embodiment of the present invention, the reference bitstream and associated model in more detail.

To start with, all elements in the model are set to CBS mode. Thus when the first message bitstream 30 is received, the pre-parse phase executed for this element is shown in FIG. 7. Thus the current bitstream offset for the received message is saved as the start offset for the current element in the model (step 450). FIG. 18 shows in more detail how the reference bitstream has characters stored at different offsets and how relevant offset details are stored against the model being used. So here, the offset bitstream is currently 0 and this is stored against the Message element in the model.

The received message is then parsed as previously described, except that the ParseElement method call begins with a determination of the mode of the element being made at step 300. Five modes are possible: CachingBitStream (CBS); Monitoring (M); CachingOutputs (CO); Repetitive (R); and Non-Repetitive (NR). These will be described in more detail later. Suffice to say for now that for all modes except Repetitive, processing proceeds to step 330.

Since all elements start in CBS mode, processing for the Message model element proceeds to step 330 where a start element event is generated. Because Message has a child (A1), the ParseElementAndSiblings method is called and this in turn causes A1 to be parsed. As indicated previously, each element prior to being parsed goes through a pre-parse phase. A1 is also in CBS mode and therefore the current bitstream offset of 0 is also recorded against element A1 in the model. This is also true for element A21.

Element A21 has no children and therefore branch 370 is followed and bitstream value of message 30's A21 field is extracted and a data event is generated. The bitstream offset pointer is then moved on at step 390 such that it now points to character 2 of message 30's A21 field in the reference bitstream.

Figure 11:
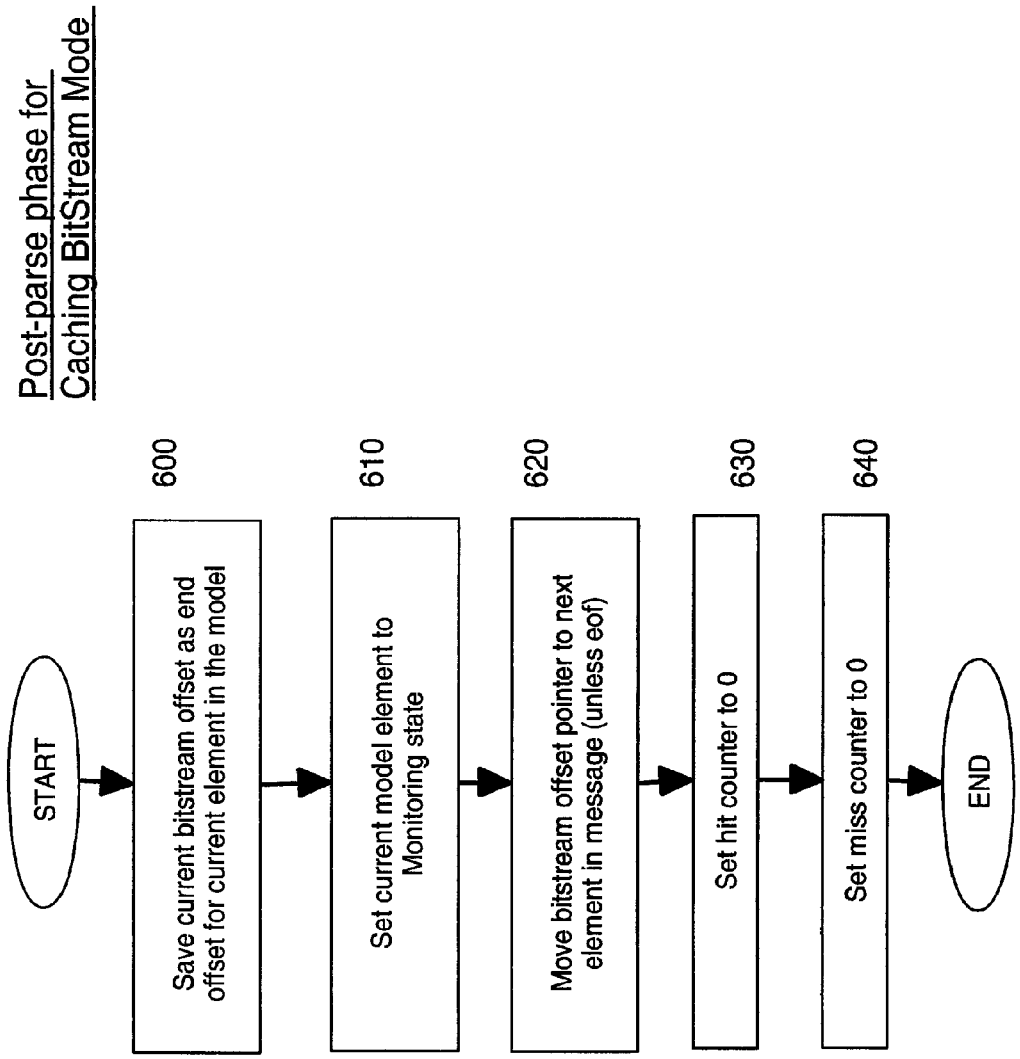
FIG. 11 shows the post-parse processing of a preferred embodiment of the present invention when in CachingBitStream mode.

Once an end element event has been generated for A21 as per step 395, the post-parse phase of step 220 (FIG. 3) can be executed. FIG. 10 provides an overview of the post-parse phase. The processing that is executed at this stage is dependent upon the mode that the model element is in. Since element A21 is currently in CBS mode, the detailed processing of FIG. 11 is followed.

At step 600, the current bitstream offset is saved as the end offset for the current element in the model. This is shown in FIG. 18.

The current model element A21 is set to the Monitoring state at step 610 and the bitstream offset pointer is then moved to point to the start of the next field in the reference bitstream (step 620). Both the hit counter and miss counter are set to 0 at steps 630, 640. The meaning of these counters will be described in more detail later.

As per FIG. 5, processing then proceeds to A21's sibling A22. Element A22 is also in CBS mode and so the pre-parse processing of FIG. 7 is executed. This involves saving the current bitstream pointer offset as the current offset against the current element A22 in the model. This is shown in FIG. 18. The processing of branch 330, 340, 370, 380, 390 and 395 is then followed. Thus in addition to parsing element A22 as previously described and generating a data event for this simple element, the bitstream offset pointer is moved to point to the end of message 30's field A22 at step 390. An end element event is generated at step 395 and this causes the post-parse phase to be executed for this element. As indicated by FIG. 11, this results in the current bitstream offset pointer being saved as the end offset for the current element in the model at step 600. Again, this is shown in FIG. 18. Model element A22 is set to Monitoring mode at step 610. The bitstream pointer is then moved to point to the next field in the message at step 620 and the hit and miss counters for that element are set to 0 (steps 630; 640).

As A22 has no more siblings, processing returns to the place from which the ParseElementAndSiblings call was made (i.e. step 360 of FIG. 4). Pointer M is updated to point to A22's parent A1 at step 365 and an end element event is generated for A1 at step 395. At step 397 the post-parse processing of FIG. 11 is called for model element A1.

The current bitstream offset is saved as the end offset for element A1 as shown in FIG. 18 (step 600). The current model element A1 is set to Monitoring mode at step 610 and the bitstream offset pointer is updated to point to the next field in the message at step 620. The hit and miss counters for A1 are set to 0 (steps 630, 640).

Processing then moves to A1's sibling B1 at step 410 and the pointer M is also updated. ParseElement is called at step 400 on element B1 and this causes the pre-parse processing of FIG. 7 to be called at step 290. This means that the current bitstream offset is saved against the current model element (as shown in FIG. 18).

The ParseElement method is then called and it is determined at step 300 that this element is also in CBS mode. Consequently a start element event is generated at step 330. Since B1 has no children, steps 340 through 395 are followed and this involves the bitstream offset pointer being moved to the end of message 30's B1 field (step 390) after a data event has been generated for B1 at step 380. An end event is generated for B1 at step 395 and then the post-parse phase is then called for model element B1.

As B1 is in CBS mode, FIG. 10 indicates that the appropriate post-parse phase processing is illustrated by FIG. 11. At step 600, the current bitstream offset is saved as the end offset for the current element in the model. This is shown in FIG. 18. Model element B1 in the model is set to Monitoring mode at step 610. The bitstream offset pointer for the current element is moved to the next field C1 (step 620), and the hit and miss counters are set to 0 (steps 630; 640).

Processing then moves to B1's sibling C1 (step 410 of the ParseElementAndSiblings method). The pre-parse processing of FIG. 7 is then executed and this involves saving offset position 8 against model element C1 (as shown in FIG. 18).

ParseElement is then called on C1 (step 400) and as model element C1 is in CBS mode, processing proceeds to step 330 where a start element event is generated. Since C1 does have children (C21 and C22), the parser moves to the first child (step 350) and the ParseElementAndSiblings method call is made at step 360.

This method recursively calls the ParseElement method (step 400) on element C21. At step 290, the pre-parse processing of FIG. 7 is called. This means that the current bitstream offset is saved against model element C21, as shown in FIG. 18.

Element C21 is in CBS mode (step 300) and so a start element event is generated at step 330. Because C21 does not have any children, path 370 through 397 is followed. In addition to parsing the element, the bitstream offset pointer is moved to the end of field C21 at step 390 and after an end element event has been generated at step 395, the post-parse processing of FIG. 11 is called. This results in the current bitstream offset being saved as the end offset for the current element in the model as shown in FIG. 18 (step 600).

At step 610, the C21 element in the model is set to Monitoring mode. The bitstream offset pointer is moved to the next field in the message which is C22 at step 620 and the hit and miss counters for that element are set to 0 (steps 630; 640).

Processing returns from the ParseElement call to the ParseElementAndSiblings call at step 400. At step 410, processing moves to C21's sibling C22 and the ParseElement method is then called at step 400 on element C22. The pre-parse processing of FIG. 7 is then called for element C22 (step 290). This results in the current bitstream offset being saved as the start offset for the element in the model at step 450. This is shown in FIG. 18.

Since model element C22 is in CBS mode, a start element event is generated for C22 at step 300. C22 does not have any children and so steps 370 through 397 are followed. In addition to parsing the element, this includes moving the bitstream offset pointer to the end of the message field (step 390). After an end element event has been generated at step 395, the post-parse processing of FIG. 11 is called at step 397.

In accordance with FIG. 11, the current bitstream offset is saved at step 600 as the end offset for the current element in the model (as shown in FIG. 18). The current model element C22 is set to Monitoring mode at step 610. Step 620 is not performed since the end of the message (eom) has been reached. At steps 630 and 640, the hit and miss counters are set to 0 for element C22.

Having parsed element C22, processing returns to step 410. Since C22 does not have another sibling, processing returns to the point from which the call to ParseElementAndSiblings was originally made (i.e. step 360) and continues with step 365 which updates M to point to parent element C1. An end element event is then generated for C1 at step 395 and the post-parse processing of FIG. 11 is called at step 397.

The current bitstream offset pointer is saved as an end offset for the current element in the model at step 600. This is shown in FIG. 18. At step 610, model element C1 is updated to Monitoring mode. The bitstream offset pointer is not updated at step 620 because the eom has been reached. The hit and miss counters for the element are set to 0 at steps 630, 640.

Since C1 has no more siblings processing returns from the ParseElementAndSiblings method of FIG. 5 to step 360 of FIG. 4. Processing proceeds to step 370 where pointer M is updated to point to the parent Message element. At step 395, an end element event is generated for Message and the post-parse processing of FIG. 11 is then called at step 397 on model element Message.

The current bitstream offset is saved as the end offset for the current element Message as shown in FIG. 18 (step 600). The Message element is set to Monitoring mode at step 610. Since the end of message has been reached, step 620 is not performed. Hit and miss counters for this model element are set to 0 at steps 630, 640.

Processing now ends for this message. Using the CachingBitStream mode, a reference bitstream has been saved, along with appropriate bitstream offset information, against which to compare future messages received.

All elements in the model are now set to Monitoring mode. In Monitoring mode, subsequent messages are compared to determine whether there are a suitable number of matches between parts of the subsequent messages and the reference bitstream 30. Although not specifically shown in the figures, pointer M is reset to the root of the model again and the bitstream offset pointer is reinitialised to 0.

Figure 8:
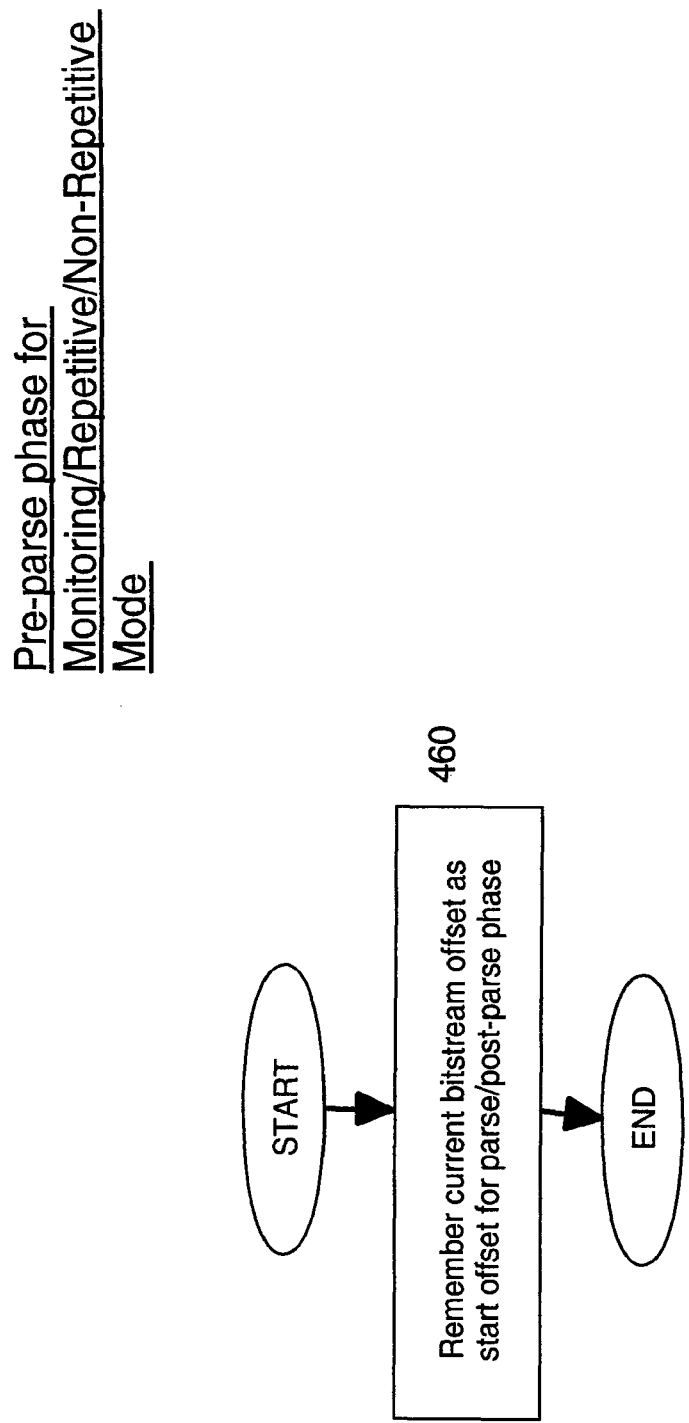
FIG. 8 depicts the pre-parse processing of a preferred embodiment of the present invention when in Monitoring or Repetitive mode.
Figure 12:
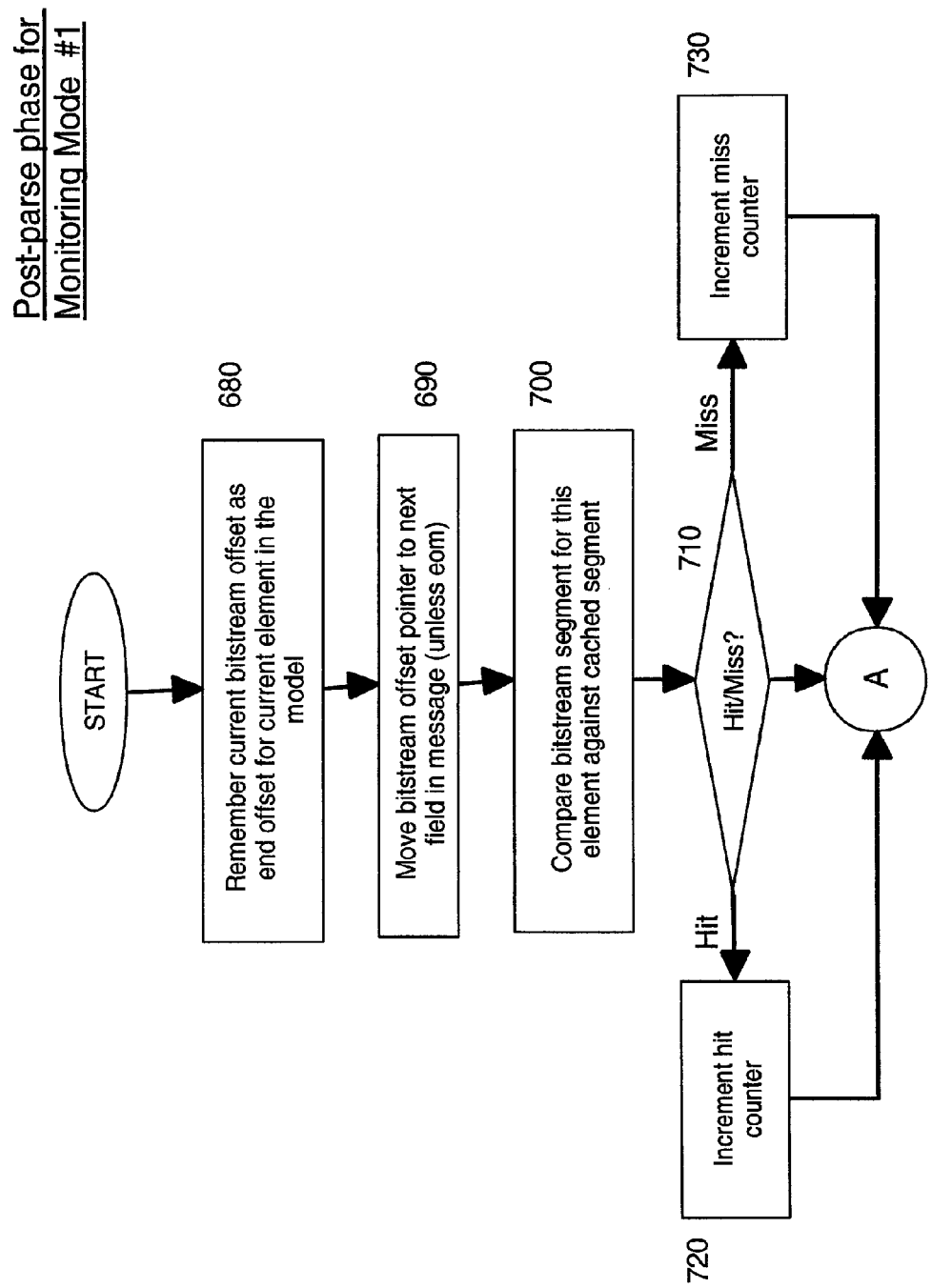
FIGS. 12 and 13 show the post-parse processing of a preferred embodiment of the present invention when in Monitoring mode.
Figure 13:
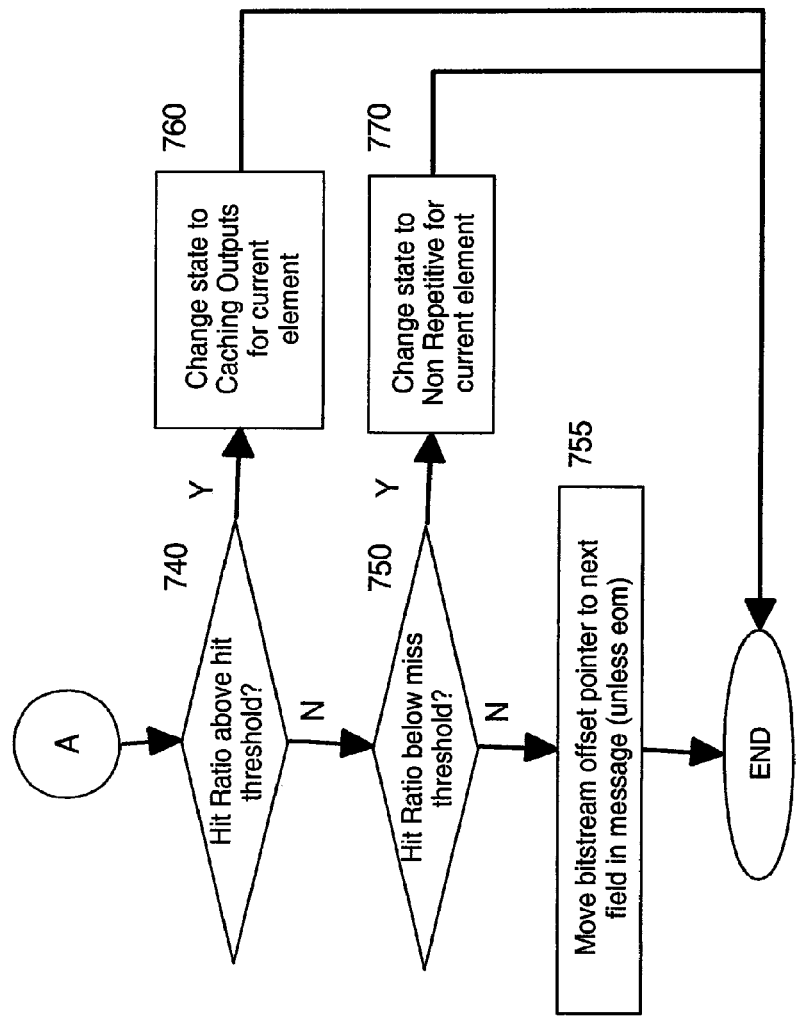

New message 40 "A211, A22, B11, C21, C22" (FIG. 17) is received and parsed using the processing of FIGS. 4 and 5. Before parsing each element the pre-parse processing of FIG. 8 is executed. This involves remembering the current bitstream offset as the start offset for use in the post-parse phase (step 460). The post-parse processing of FIGS. 12 and 13 is executed once an element has been parsed and an end element event generated at step 395.

As part of the post-parse processing, the current bitstream offset is remembered as the end offset (step 280). The bitstream offset pointer is then moved onto the next message field unless the eom has been reached (step 290). The message field for the current model element is then compared (using the remembered start and end offsets) against the segment of the reference bitstream identified by the start and end offsets stored against the current model element. If there is a match (a hit), then a hit counter is incremented at step 720, whilst if there is a miss, the miss counter is incremented at step 730. Processing then proceeds to FIG. 13.

The hit and miss counters are used to determine a hit ratio (hits/hits+misses). If the hit ratio is above a hit threshold (step 740), then the state of the current model element is modified to CachingOutputs mode (step 760). If on the other hand, the hit ratio is below the miss threshold at step 750, then the state for the current element is changed to NonRepetitive at step 770.

The hit threshold is chosen such that once reached, it indicates a reasonable certainty that the reference bitstream segment associated with the current element is likely to be repeated relatively frequently in subsequent messages.

The miss threshold is chosen such that when the hit ratio drops below that threshold, it is deemed unlikely that the reference bitstream segment associated with the current model element is unlikely to be repeated relatively frequently in subsequent messages.

With respect to message 40 (FIG. 17), the processing discussed directly above will identify a match (hit) between message 40's second field A22 and reference bitstream 30's second field. A hit will also be identified for message 40's 3rd field C21.

For message 50, there will be a complete match identified and for message 60, the first three fields match.

As indicated above, once a sufficient hit ratio has been reached with respect to a particular model element, that element is moved into CachingOutputs mode.

CachingOutputs mode is used when it is recognised that the segment of the reference bitstream associated with the current model element is likely to repeat relatively frequently. For this reason it is deemed worth storing the parser outputs for that element for reuse.

The bitstream offset pointer is now moved to the next field in the message at step 755.

Figure 9:
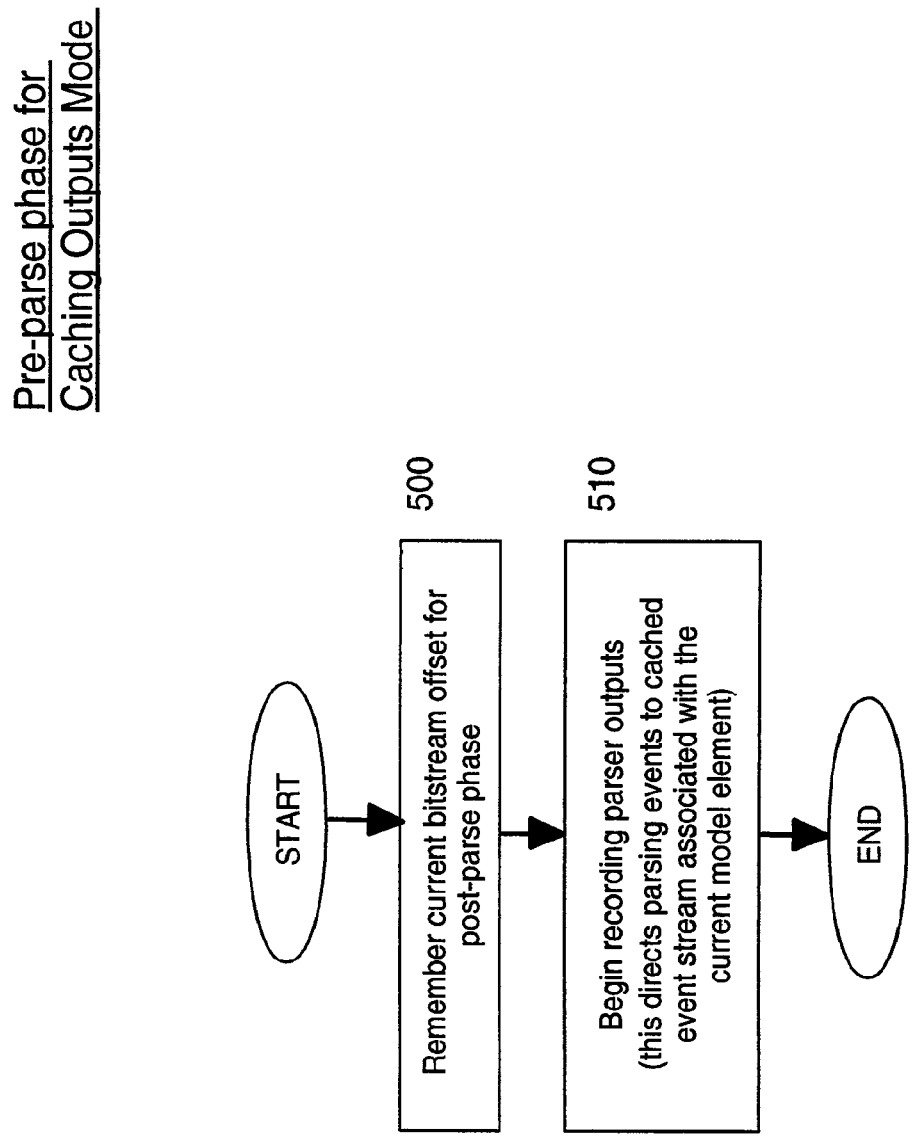
FIG. 9 depicts the pre-parse processing of a preferred embodiment of the present invention when in CachingOutputs mode.

Each element in CachingOutputs mode is pre-parsed using the processing of FIG. 9. Thus at step 500, the current bitstream offset position is remembered as the start offset for the post-parse phase (step 500). At step 500, it is determined that the system should begin recording any parser outputs that are generated (e.g. at steps 330, 380 and 395).

Figure 14:
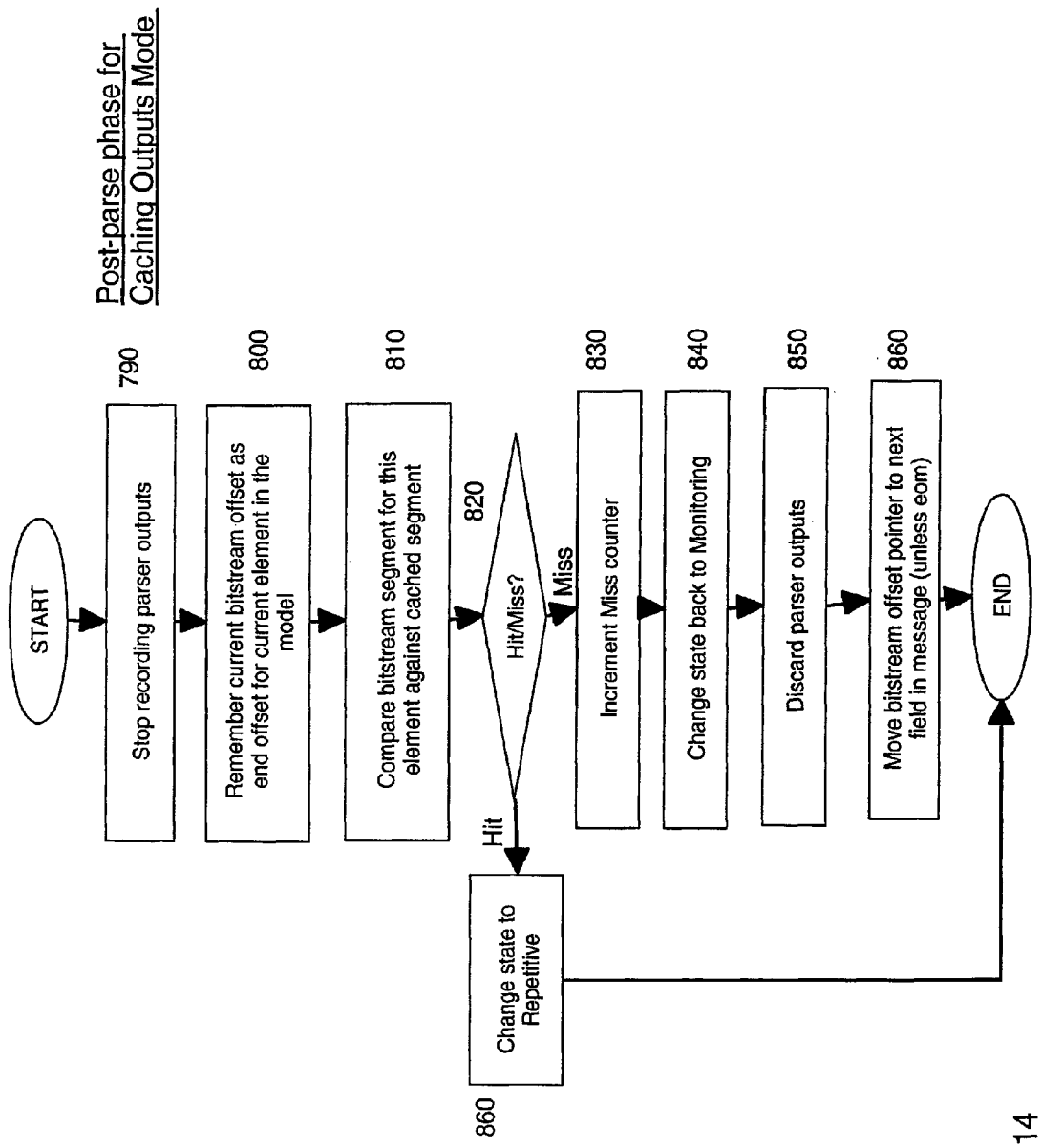
FIG. 14 shows the post-parse processing of a preferred embodiment of the present invention when in CachingOutputs mode.

Once an end element event has been generated at step 395, the post-parse processing of FIG. 14 is performed. At step 800, the system stops recording parser outputs. At step 805, the bitstream offset remembered as the end offset.

At step 810, the appropriate bitstream segment (as defined by the remembered start and end offsets) for the current element are compared against the portion of the reference bitstream identified by the start and end offsets stored in the model for the current element.

If there is a match (hit), then the state of the current element is changed to Repetitive. On the other hand, if there is a miss, then the miss counter is incremented (step 830) and the state of the element is changed back to Monitoring (step 840). The recorded parser outputs are discarded at step 850. The bitstream offset pointer is moved at step 860 to point to next field in message.

In alternative embodiment, in the Monitoring mode, if it is determined at step 740 that the hit ratio is taken above the hit threshold for the current message parse, then the relevant parser outputs are saved and the state of the current element is changed to Repetitive. This dispenses with the need for a CachingOutputs mode.

So, to reiterate, all model elements which have parser outputs recorded and associated with them are now in Repetitive mode. This is because it has been determined that for a particular Repetitive element, the equivalent field in subsequent messages is likely to be identical.

For an element in Repetitive mode, the pre-parse processing of FIG. 8 is executed. Thus at step 460, the current bitstream offset is remembered as the start offset for use in the parsing phase.

When parsing a Repetitive element as per FIG. 4, it is determined at step 300 that the mode is indeed Repetitive. Consequently, a determination is made at step 310, whether the current message bitstream segment matches the cached reference bitstream segment. This is achieved by referring to the cached bitstream using the remembered start offset and end offset In an alternative embodiment, each model element might store its own copy of any repetitive bitstream segment which it wishes to use.

Figure 15:
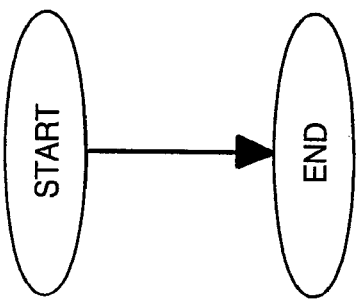
FIG. 15 illustrates the post-parse processing of a preferred embodiment of the present invention when in Repetitive mode.

If on the other hand it is determined that the current message field is identical to the equivalent part of the reference bitstream, then the cached events for this model element are replayed at step 320. These are the events cached during the time when the same model element was in CachingOutputs mode. Thus CPU processing is saved since the parser does not need to actually parse the current message field. As shown by FIG. 15, for a Repetitive model element, there is no actual post-parse processing.

Figure 16:
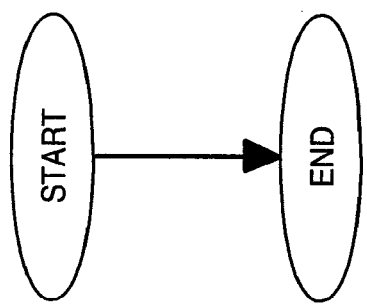
FIG. 16 illustrates the pre and post-parse processing of a preferred embodiment of the present invention when in Non-Repetitive mode.

For model elements that are deemed NonRepetitive. As shown by FIG. 16, there is no actual pre or post-parse processing. This figure is simply included for completeness.

The solution has been described in terms of one reference bitstream. It would equally be possible to periodically reset all model elements back to CBS mode and to save additional reference bitstreams for comparison against. This would mean storing different start and end offset positions against the model elements and referencing each start and end set with a particular reference bitstream.

The embodiment described includes storing offset positions into the reference bitstream. In an alternative embodiment, the appropriate portion of the reference bitstream is stored against each model element instead. This does however take up more storage. For example, model element 'Message' has the complete message stored against it, and the child elements of Message each have a segment of the same bitstream stored against them. Thus such a method results in the message bitstream being stored multiple times.

To summarise, the solution described exploits the presence of a message model. It stores non-changing segments of bitstream and their corresponding parser outputs against elements in the model. This technique allows efficient parsing of small and widely-dispersed parts of a message while leaving undisturbed the normal parsing of non-repetitive portions. The technique scales equally well to cases where almost the entire message is repetitive.

The model-based nature of this solution also allows the parser to analyse the message model to identify elements which should not participate in optimised parsing (i.e. to turn off the optimisation of the disclosed solution for certain elements where the optimisation is not appropriate) even when their segment of bitstream is identical to that in previous messages. This possibility need not be explored any further in this description, as it will be clear to one of ordinary skill in the art that this and other modifications and enhancements are possible.

APPENDIX A

```
ParseElement ( Message )
{
    GENERATE START ELEMENT EVENT ( Message )
    MoveToFirstChild ( A1 )
    ParseElementAndSiblings ( A1 )
    {
        ParseElement ( A1 )
        {
            GENERATE START ELEMENT EVENT ( A1 )
            MoveToFirstChild ( A21 )
            ParseElementAndSiblings ( A21 )
            {
                ParseElement ( A21 )
                {
                    GENERATE START ELEMENT EVENT
                      ( A21 )
                    GENERATE DATA EVENT FOR A21
                    GENERATE END ELEMENT EVENT ( A21 )
                }
                MoveToSibling ( A22 )
                ParseElement ( A22 )
                {
                    GENERATE START ELEMENT EVENT
                      ( A22 )
                    GENERATE DATA EVENT FOR A22
                    GENERATE END ELEMENT EVENT ( A22 )
                }
            }
            GENERATE END ELEMENT EVENT ( A1 )
        }
        MoveToSibling ( B1 )
        ParseElement ( B1 )
        {
            GENERATE START ELEMENT EVENT ( B1 )
            GENERATE DATA EVENT FOR B1
            GENERATE END ELEMENT EVENT ( B1 )
        }
        MoveToSibling ( C1 )
        ParseElement( C1 )
```

APPENDIX A-continued

```
        {
            GENERATE START ELEMENT EVENT ( C1 )
            MoveToFirstChild ( C21 )
            ParseElementAndSiblings ( C21 )
            {
                ParseElement ( C21 )
                {
                    GENERATE START ELEMENT EVENT ( C21 )
                    GENERATE DATA EVENT FOR C21
                    GENERATE END ELEMENT EVENT ( C21 )
                }
                MoveToSibling ( C22 )
                ParseElement ( C22 )
                {
                    GENERATE START ELEMENT EVENT ( C22 )
                    GENERATE DATA EVENT FOR C22
                    GENERATE END ELEMENT EVENT ( C22 )
                }
            }
            GENERATE END ELEMENT EVENT ( C1 )
        }
    }
    GENERATE END ELEMENT EVENT ( Message )
}
```

The invention claimed is:

1. A method for parsing a message using a message model comprising:

executing a message broker in memory of a computer;

receiving by the message broker, a reference message data set that is organized to include a plurality of fields with each of the plurality of fields including reference message field content;

storing by the message broker the reference message data set in a reference bitstream data structure including a plurality of reference bitstream portions respectively corresponding to the field content of the plurality of fields of the reference message data set;

receiving, by the message broker, a plurality of additional message data sets, with each additional message data set in a respectively corresponding additional bitstream data structure including a plurality of bitstream portions respectively corresponding to the field content of the plurality of fields of the given additional message data set;

for each given bitstream portion of each given additional bitstream data structure, comparing, by machine logic of the message broker, the given bitstream portion to the respectively corresponding reference bitstream data portion to determine whether there is a match; and for each reference bitstream portion:

determining whether the number of matches to the given reference bitstream portion exceeds a predetermined threshold value, and responsive to a determination that the given reference bitstream portion was subject to a number of matches exceeding the threshold value, parsing reference field content of the field of the reference message data set corresponding to the given reference bitstream portion.

2. The method of claim 1, further comprising subsequent to the parsing of the reference field content of the field of the reference message data set corresponding to the given reference bitstream portion, storing parser outputs for the field of the reference message data set for future reuse in lieu of parsing a corresponding field in later received message.

3. The method of claim 1, wherein the step of storing the reference message data set in a reference bitstream comprises:

storing a portion of the reference message data set in a reference bitstream against each associated element in the message model.

4. The method of claim 1, further comprising:

for each reference bitstream portion:

responsive to a determination that the given reference bitstream portion was subject to a number of matches exceeding the threshold value, indicating a field corresponding to the given reference bitstream portion as repetitive, and responsive to a determination that the given reference bitstream portion was not subject to a number of matches exceeding the threshold value, indicating a field corresponding to the given reference bitstream portion as non-repetitive.

5. The method of claim 2 further comprising:

determining that parser outputs are stored for a particular message field in a subsequently received message; and using the parser outputs instead of parsing the message field.

6. An apparatus comprising a computer with a computer program executing therein the computer program comprising program code enabled for performing a method of parsing a message using a message model comprising:

receiving in a message broker executing in memory of a computer, a message comprising one or more message fields;

storing the message by the message broker as a reference bitstream indicating both repetitive and non-repetitive portions;

receiving a multiplicity of subsequent messages in the message broker;

using the message model to compare a message field in one or more subsequently received messages with the equivalent field in the reference bitstream;

responsive to determining that a message field in said one or more subsequently received messages matches a field in the reference bitstream a predetermined number of times, indicating in the reference bitstream that the field in the reference bitstream is one of the repetitive portions and storing parser outputs for the matching field for future reuse; and for each reference bitstream portion:

determining whether the number of matches to the given reference bitstream portion exceeds a predetermined threshold value, and responsive to a determination that the given reference bitstream portion was subject to a number of matches exceeding the threshold value, parsing reference field content of the field of the reference message data set corresponding to the given reference bitstream portion.

7. The apparatus of claim 6, wherein using the message model to compare a message field in said one or more subsequently received messages comprises:

storing an index into each message field in the reference bitstream against an equivalent element in the message model.

8. The apparatus of claim 6, wherein storing the message as a reference bitstream comprises:

storing a portion of the reference bitstream against each associated element in the message model.

9. The apparatus of claim 6, comprising:

determining that a message field in said one or more subsequently received message matches a field in the reference bitstream a predetermined number of times.

10. The apparatus of any of claim 6 comprising:

determining that parser outputs are stored for a particular message field in a subsequently received message; and using the parser outputs instead of parsing the message field.

* * * * *